(12) United States Patent
Heu

(10) Patent No.: US 8,467,134 B2
(45) Date of Patent: Jun. 18, 2013

(54) COMPACT ZOOM LENS

(75) Inventor: Min Heu, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 50 days.

(21) Appl. No.: 13/106,003

(22) Filed: May 12, 2011

(65) Prior Publication Data
US 2012/0033308 A1    Feb. 9, 2012

(30) Foreign Application Priority Data
Aug. 5, 2010    (KR) ........................ 10-2010-0075674

(51) Int. Cl.
  *G02B 15/14*    (2006.01)
(52) U.S. Cl.
  USPC .......................................... 359/686; 359/683
(58) Field of Classification Search
  USPC .................................. 359/686, 683
  See application file for complete search history.

(56) References Cited

U.S. PATENT DOCUMENTS

| | | | |
|---|---|---|---|
| 5,539,581 A | 7/1996 | Sato | |
| 5,563,739 A | 10/1996 | Sato | |
| 5,715,097 A | 2/1998 | Shibayama et al. | |
| 5,764,421 A | 6/1998 | Shimizu et al. | |
| 5,793,532 A * | 8/1998 | Kawamura | 359/686 |
| 6,308,011 B1 | 10/2001 | Wachi et al. | |
| 7,177,095 B2 | 2/2007 | Sugiyama et al. | |

* cited by examiner

*Primary Examiner* — William Choi
(74) *Attorney, Agent, or Firm* — Drinker Biddle & Reath LLP

(57) ABSTRACT

A zoom lens includes: a first lens group having a negative refractive power; a second lens group having a positive refractive power; a third lens group having a positive refractive power and including one piece of positive lens; and a fourth lens group having a negative refractive power, wherein the first, second, third, and fourth lens groups are sequentially disposed in an order from an object side to an image surface side of the zoom lens, all distances between adjacent lens groups change and the third lens group performs focusing while zooming from a wide angle position to a telephoto position, and a following condition is satisfied: $0 < (L_{23W} - L_{23T})/L_{23W} < 0.5$, wherein $L_{23W}$ denotes a distance between a lens surface of the image surface side of the second lens group and lens surface of the object side of the third lens group in the wide angle position, and $L_{23T}$ denotes a distance between a lens surface of the image surface side of the second lens group and a lens surface of the object side surface of the third lens group in the telephoto position.

18 Claims, 9 Drawing Sheets

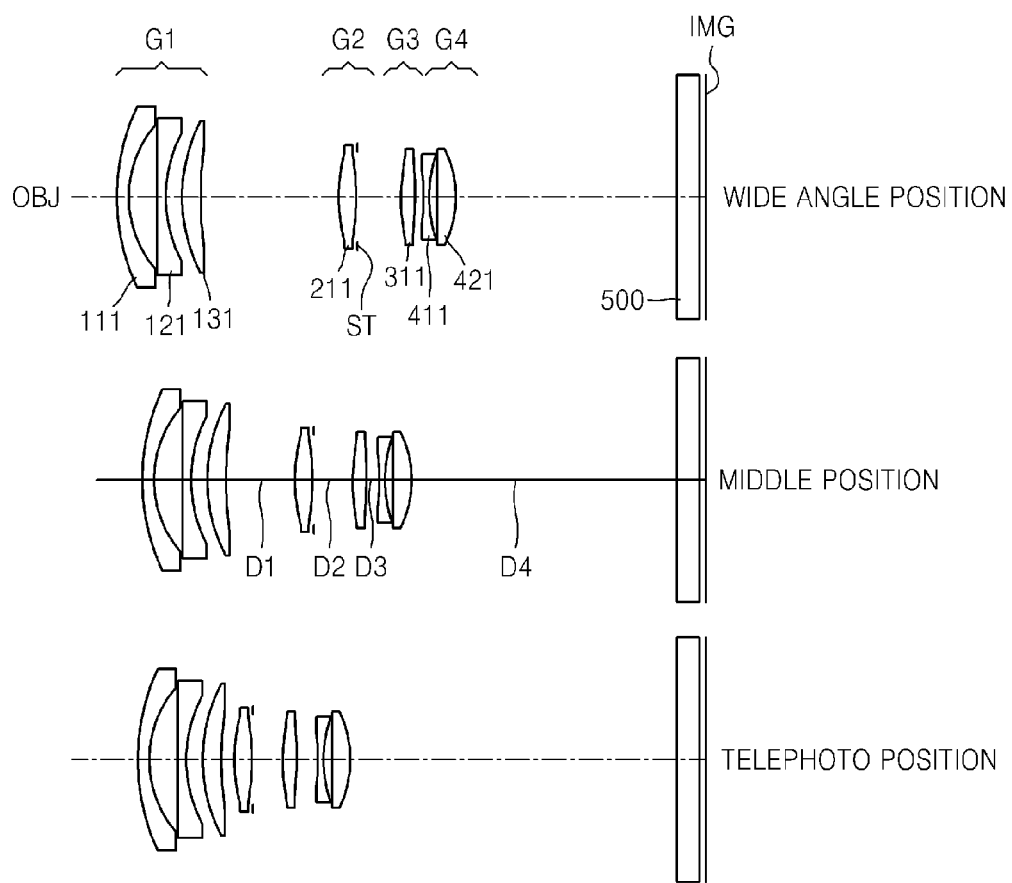

FIG. 2C
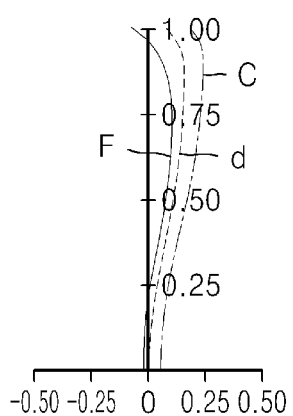
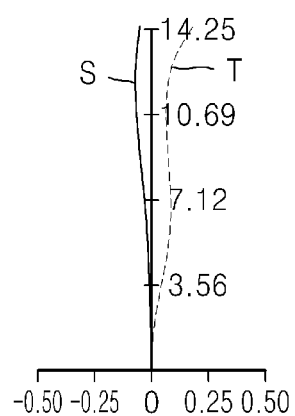
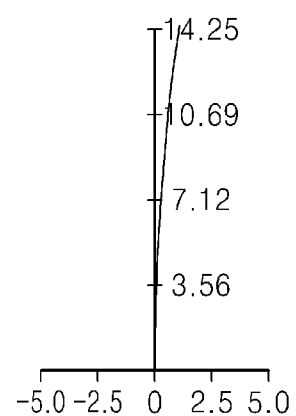

FIG. 4A
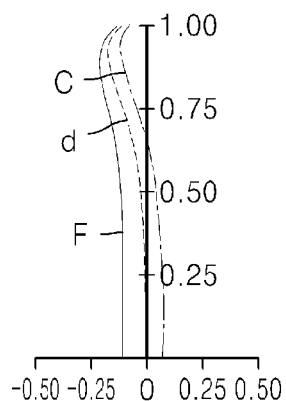
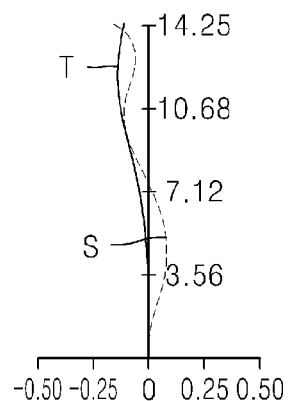
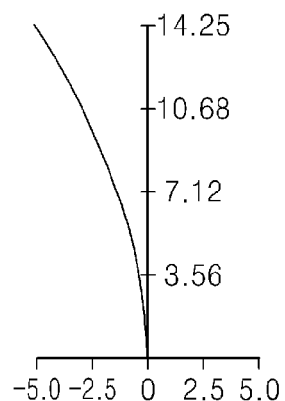
FIG. 4B
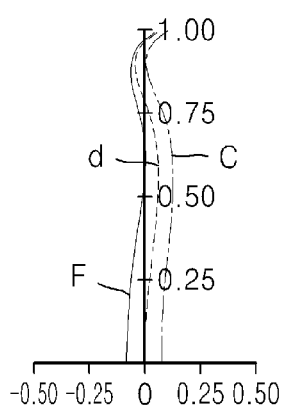
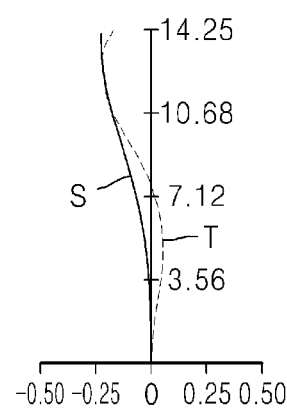
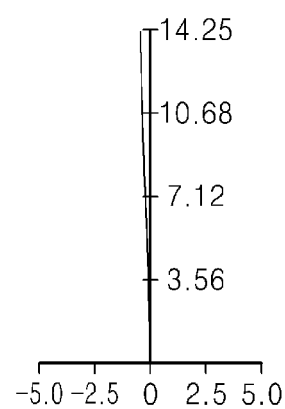

FIG. 6C
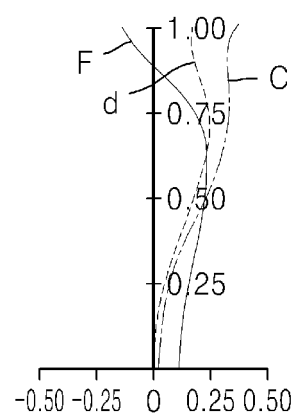
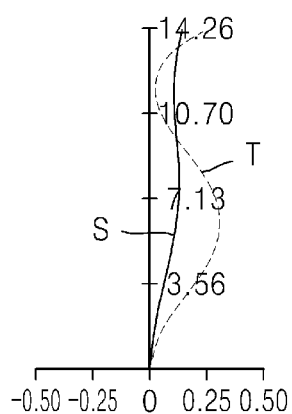
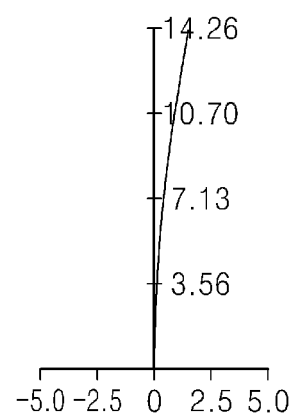

COMPACT ZOOM LENS

CROSS-REFERENCE TO RELATED PATENT APPLICATION

This application claims the priority benefit of Korean Patent Application No. 10-2010-0075674, filed on Aug. 5, 2010, in the Korean Intellectual Property Office, the disclosure of which is incorporated herein in its entirety by reference.

BACKGROUND

1. Field of the Invention

Embodiments relate to a zoom lens suitable for an imaging device employed in a miniature digital camera, a digital video camera, a mobile phone, a personal digital assistant (PDA), or the like.

2. Description of the Related Art

Recently, distribution of image forming optical devices, such as digital cameras or digital camcoders that use an image pickup device like a charge coupled device (CCD) or a complementary metal-oxide semiconductor (CMOS), is rapidly expanding. Accordingly, a zoom lens that is highly efficient, small, and light is required.

Also, an exchangeable lens camera, wherein a user may exchange lenses according to a photographing purpose, is typically required to have excellent optical performance with a compact size to be easily carried.

In order to manufacture a camera having a compact size, a driving unit such as a motor for auto focusing (AF), may be removed from a camera body, and a function of the driving unit may be installed in an exchangeable lens. In this case, a size of the exchangeable lens is increased and so as to counterbalance the increased size of the exchangeable lens due to the driving unit, it is important to design the lens itself to perform AF with a small driving source. Thus, an AF lens group is desired to be miniaturized and light-weighted in terms of an optical design.

Generally, when a distance of an object changes from an infinity to a short distance, AF is performed by using a first lens group that is capable of obtaining an excellent optical performance in the entire distance of the object. However, lenses included in the first lens group typically have large diameters and are heavy, and thus it is difficult to perform the AF by using a small driving source.

Even a conventional inner focus method, which does not use the first lens group in performing AF, uses too many lenses in an AF optical system, and thus it is difficult to maintain a low price and a compact size of a camera.

SUMMARY

One or more embodiments include a standard zoom lens optical system, which realizes an excellent optical performance, has a compact structure, and includes a small and light-weight auto focusing (AF) lens group.

According to an embodiment, a zoom lens includes: a first lens group having a negative refractive power; a second lens group having a positive refractive power; a third lens group having a positive refractive power and including one piece of positive lens; and a fourth lens group having a negative refractive power, wherein the first, second, third, and fourth lens groups are sequentially disposed in an order from an object side to an image surface side of the zoom lens, all distances between adjacent lens groups change and the third lens group performs focusing while zooming from a wide angle position to a telephoto position, and a following condition is satisfied:

$$0<(L_{23W}-L_{23T})/L_{23W}<0.5,$$

wherein $L_{23W}$ denotes a distance between a lens surface of the image surface side of the second lens group and a lens surface of the object side of the third lens group in the wide angle position, and $L_{23T}$ denotes a distance between a lens surface of the image surface side of the second lens group and a lens surface of the object side of the third lens group in the telephoto position.

The Abbe number v3 of the positive lens included in the third lens group may satisfy v3>60.

The second lens group may include one piece of positive lens. At least one surface of the positive lens included in the second lens group may be aspheric.

The first lens group may include two pieces of negative lenses and one piece of positive lens.

The first lens group may include one piece of negative lens and one piece of positive lens. The first lens group may have at least one aspheric surface. Both surfaces of the negative lens of the first lens group may be aspheric.

A distance between a lens surface closest to the image surface side of the second lens group and a lens surface closest to the object side of the third lens group may be uniformly maintained while zooming from the wide angle position to the telephoto position.

BRIEF DESCRIPTION OF THE DRAWINGS

The above and other features and advantages will become more apparent by describing in detail exemplary embodiments with reference to the attached drawings in which:

FIG. 1 is a diagram of optical arrangements of a zoom lens in a wide angle position, a middle position, and a telephoto position, according to an embodiment;

FIGS. 2A, 2B, and 2C are aberration diagrams showing longitudinal spherical aberration, astigmatism, and distortion respectively in the wide angle position, the middle position, and the telephoto position of the zoom lens of FIG. 1, according to an embodiment;

FIGS. 4A, 4B, and 4C are aberration diagrams showing longitudinal spherical aberration, astigmatism, and distortion respectively in the wide angle position, the middle position, and the telephoto position of the zoom lens of FIG. 3, according to an embodiment;

FIGS. 6A, 6B, and 6C are aberration diagrams showing longitudinal spherical aberration, astigmatism, and distortion respectively in the wide angle position, the middle position, and the telephoto position of the zoom lens of FIG. 5, according to an embodiment.

DETAILED DESCRIPTION

Figure 2A:
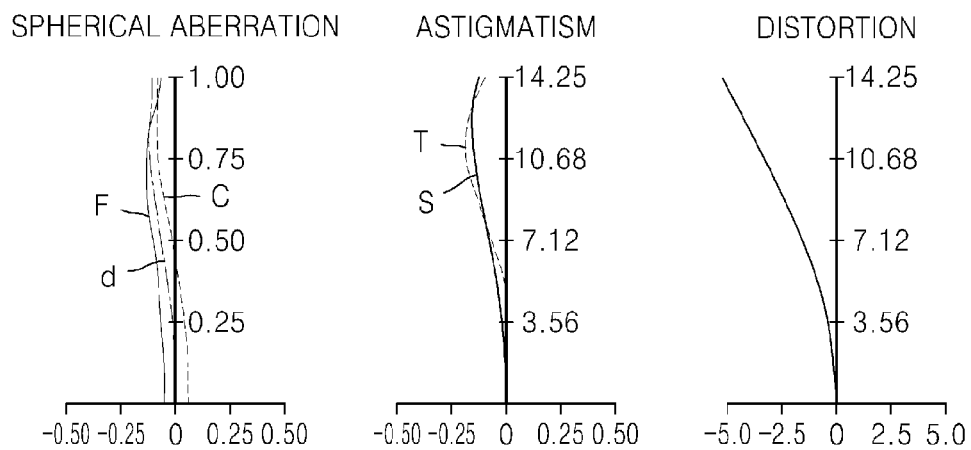

Hereinafter, exemplary embodiments will be described more fully with reference to the accompanying drawings. In the drawings, like reference numerals denote like elements, and the sizes and thicknesses of each element may be exaggerated for clarity.

Figure 3:
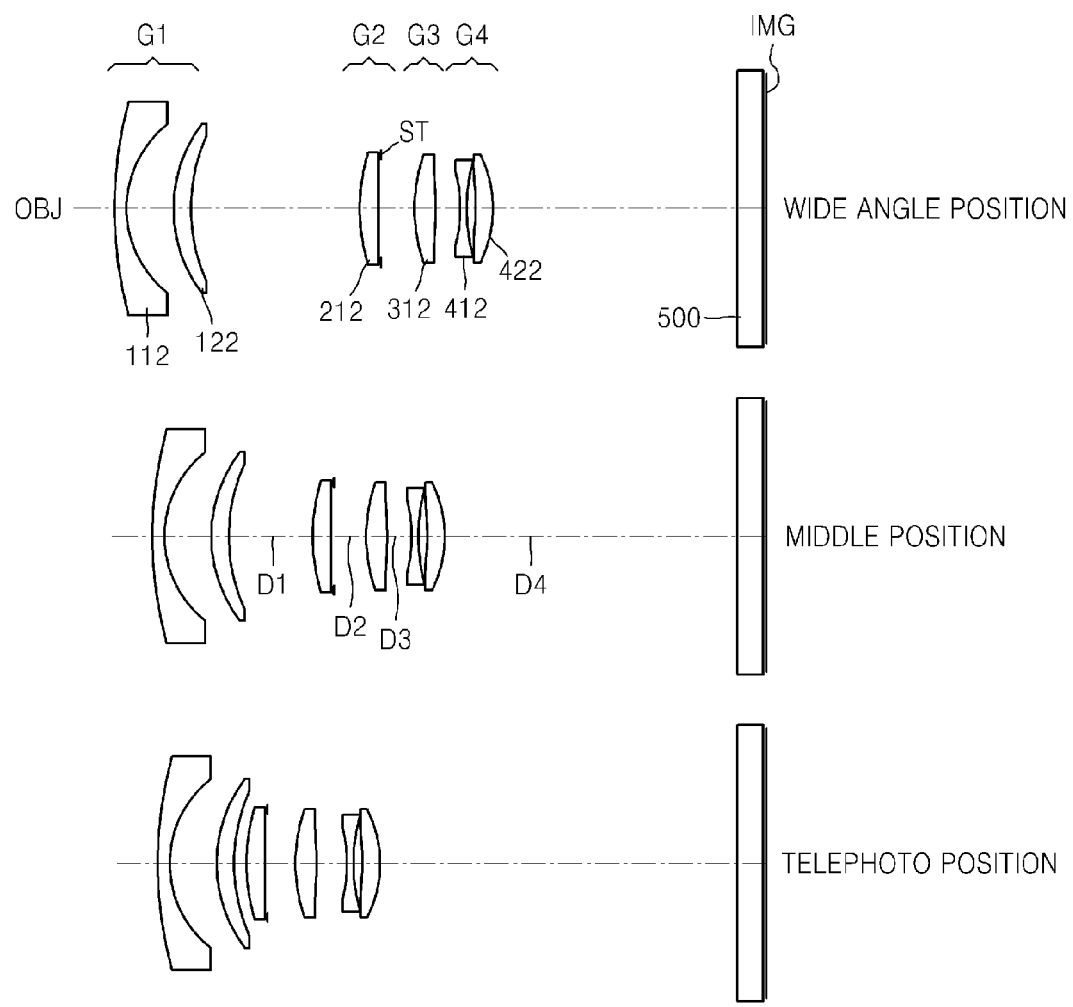
FIG. 3 is a diagram of optical arrangements of a zoom lens in a wide angle position, a middle position, and a telephoto position, according to another embodiment.
Figure 5:
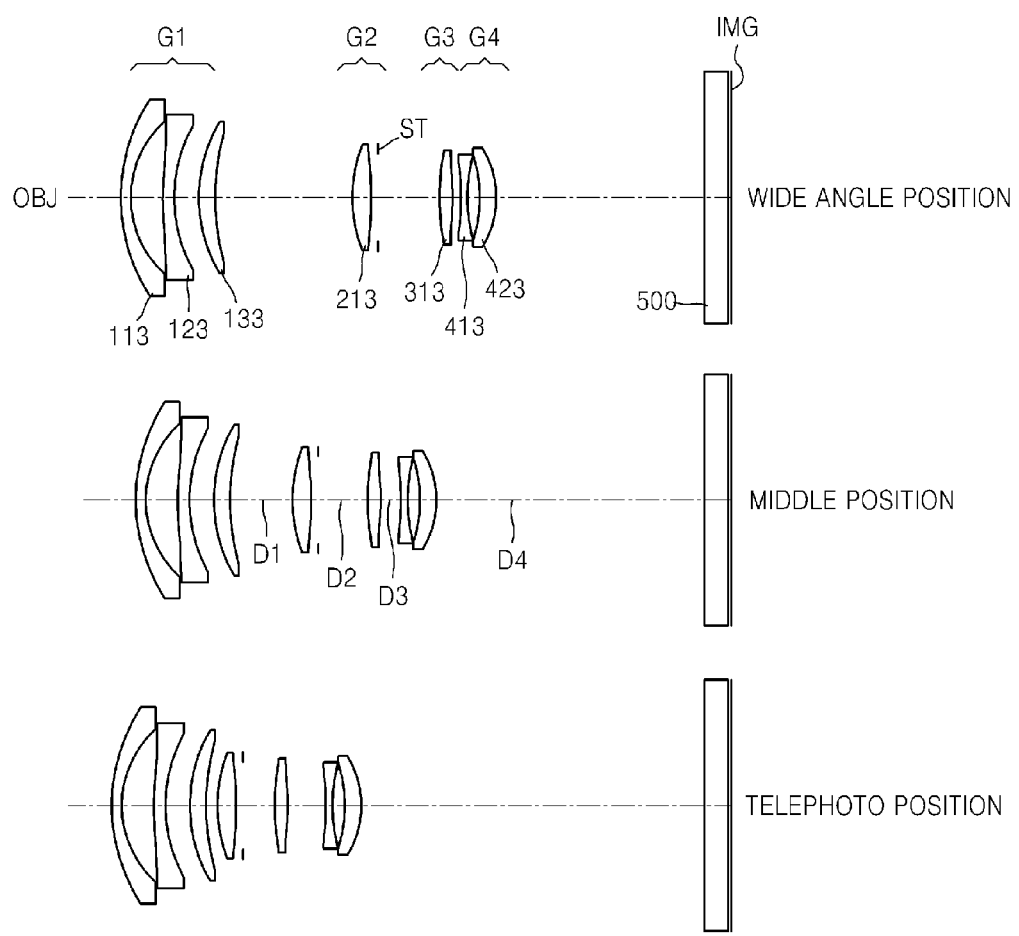
FIG. 5 is a diagram of optical arrangements of a zoom lens in a wide angle position, a middle position, and a telephoto position, according to another embodiment.

FIGS. 1, 3, and 5 are diagrams of optical arrangements of zoom lenses, according to embodiments.

Each of the zoom lenses according to the embodiments includes a first lens group G1 having a negative refractive power, a second lens group G2 having a positive refractive power, a third lens group G3 having a positive refractive power, and a fourth lens group G4 having a negative refractive power, which are sequentially arranged in an order from an object OBJ side to an image surface IMG side of the zoom lens. An aperture ST is disposed on the image surface IMG side of the second lens group G2, and an infrared light blocking filter 500 is disposed between the fourth lens group G4 and the image surface IMG.

All the first, second, third, and fourth lens groups G1, G2, G3, and G4 move and all distances between adjacent lens groups change when zooming from a wide angle position to a telephoto position. For example, the first lens group G1 moves with a locus convex toward the image surface IMG side, while the third through fourth lens groups G2, G3, and G4 move almost in a straight line from the image surface IMG side to the object OBJ side. All the distances between the adjacent lens groups change when zooming, in the embodiments, and moving distances of the second and fourth lens groups G2 and G4 are identically maintained. In other words, a distance between a lens surface closest to the image surface IMG side of the second lens group G2 and a lens surface closest to the object OBJ side of the fourth lens group G4 is uniformly maintained, so as to realize a stable optical system with a low cost. When four (4) different driving units are used to mechanically change all distances between the adjacent lens groups, the structure of the zoom lens become complex, manufacturing costs of the zoom lens increase, and it is difficult to obtain a design performance while manufacturing the zoom lens due to optical sensitivity. Accordingly, in the current embodiments, moving distances of some lens groups are set to be the same while zooming, thereby structurally simplifying an optical system.

The third lens group G3 is an auto focusing (AF) lens group that performs focusing for image compensation according to a distance of an object. The third lens group G3 is used as the AF lens group since if the first lens group G1 is used as an AF lens group like a conventional zoom lens, a size of a driving unit of the first lens group G1 increases because lenses included the first lens group G1 have largest external diameters and are heaviest from among lenses included in the zoom lens. Accordingly, the zoom lenses according to the embodiments use an inner focus method. To reduce a weight of the zoom lens, the third lens group G3 includes one piece of positive lens.

In order to miniaturize an optical system, each lens group may have a strong refractive power and a distance between lens groups may be minimized. In the wide angle position, the third lens group G3 may be near to the fourth lens group G4 so as to effectively compensate for a spherical aberration. In the telephoto position, a sufficient distance between the second lens group G2 and the third lens group G3 may be secured so that the third lens group G3 constituting the AF lens group performs focusing for compensating for an image according to a change of an object distance from infinity to a short distance. Meanwhile, in order to obtain a small zoom lens having a suitable zoom magnification, a main point of refractive power of an optical system from the second lens group G2 to the fourth lens group G4 may be disposed on the object side. Accordingly, the third lens group G3 may be disposed near to the second lens group G2.

In order to satisfy such contradicting conditions, an optimal distance between the second lens group G2 and the third lens group G3 may be determined. The zoom lenses according to the embodiments may satisfy a following condition.

$$0 < (L_{23W} - L_{23T})/L_{23W} < 0.5$$

Here, $L_{23W}$ denotes a distance between a lens surface of the image surface IMG side of the second lens group G2 and a lens surface of the object OBJ side of the third lens group G3 in the wide angle position, and $L_{23T}$ denotes a distance between a lens surface of the image surface IMG side of the second lens group G2 and a lens surface of the object OBJ side of the third lens group G3 in the telephoto position.

The above condition determines a changing amount range of an air gap between the second lens group G2 and the third lens group G3 while changing the zoom lens from the wide angle position to the telephoto position, with respect to an air gap distance between the second lens group G2 and the third lens group G3 in the wide angle position. When the upper limit is exceeded, the moving distance of the third lens group G3 is larger than the air gap distance, and thus it is difficult to obtain a sufficient space for focusing in the telephoto position. On the other hand, if the lower limit is not reached, a large air gap distance is required to satisfy above-described requirements, and thus it is difficult to miniaturize the optical system.

The zoom lenses according to the embodiments may also satisfy a following condition.

$$v3 > 60$$

Here, v3 denotes an Abbe number of the positive lens included in the third lens group G3.

The above condition is used to suppress longitudinal chromatic aberration that may be generated when an AF lens group includes one piece of lens. A change of the longitudinal chromatic aberration is reduced by using a low dispersive lens. When the Abbe number is 60 or below, an optical performance deteriorates since the change of the longitudinal chromatic aberration is increased while performing focusing according to a change of a distance of an object.

Detailed structures of first, second, third, and fourth lens groups G1, G2, G3, and G4 will now be described in detail with reference to lens data.

A definition of an aspheric surface (ASP) in the embodiments is as follows.

$$x = \frac{c'y^2}{1 + \sqrt{1 - (K+1)c'^2h^2}} + Ah^4 + Bh^6 + Ch^8 + Dh^{10}$$

Here, x denotes a distance from a vertex of a lens to an optical axis direction, y denotes a distance in a vertical direction with respect to an optical axis, K denotes a conic constant, A, B, C, and D denote aspheric coefficients, and c' denotes a reciprocal (1/R) of a radius of curvature in the vertex of the lens.

In the lens data, STO denotes an aperture and ASP denotes an aspheric surface. Also, EFL denotes an entire focal length, Fno denotes an F-number, 2ω denotes an angle of view, and D1, D2, D3, and D4 each denotes a variable distance between lenses.

FIG. 1 is a diagram of optical arrangements of a zoom lens in a wide angle position, a middle position, and a telephoto position, according to an embodiment. The first lens group G1 includes a first lens 111 having a meniscus shape and constituting a negative lens, a second lens 121 constituting a negative lens, and a third lens 131 constituting a positive lens. The second lens group G2 includes a fourth lens 211 constituting one piece of positive lens. The second lens group G2 generally includes two pieces of lenses in a conventional zoom lens, but so as to minimize the zoom lens, the second lens group G2 includes one piece of positive lens in the current embodiment. Instead, at least one surface of the fourth lens 211 is aspheric for aberration compensation. The third lens group G3 includes a fifth lens 311 constituting a positive lens, and the fourth lens group G4 includes a sixth lens 411 constituting a negative lens and a seventh lens 421 constituting a positive lens.

Lens data of the zoom lens according to the current embodiment is as follows.

| EFL: 20.63~27.81~38.80 mm Fno: 3.65~4.16~4.92 2ω: 72.25~54.6~40.0 | | | | |
|---|---|---|---|---|
| Surf | Radius | Thick | Ind | Abv |
| 1 | 28.037 | 1.20 | 1.84666 | 23.8 |
| 2 | 13.541 | 3.63 | | |
| 3 | −800.000 | 1.20 | 1.75500 | 52.3 |
| 4 | 18.779 | 1.87 | | |
| 5 | 19.779 | 2.44 | 1.84666 | 23.8 |
| 6 | 78.483 | D1 | | |
| 7 | Infinity | 0.00 | | |
| 8* ASP | 21.051 | 2.16 | 1.58313 | 59.5 |
| K: | −1.000000 | | | |
| A: −4.308475e−005 | B: 2.409897e−008 | C: −7.385826e−009 | D: 1.077548e−010 | |
| 9 | −32.698 | 0.10 | | |
| STO | Infinity | D2 | | |
| 11 | 34.414 | 1.64 | 1.48749 | 70.4 |
| 12 | −55.600 | D3 | | |
| 13 | −32.126 | 0.70 | 1.72825 | 28.3 |
| 14 | 17.616 | 1.12 | | |
| 15* ASP | −46.127 | 2.00 | 1.69350 | 53.2 |
| K: | 0.000000 | | | |
| A: 7.990710e−005 | B: −7.283741e−007 | C: 1.325045e−007 | D: −1.343725e−009 | |
| 16* ASP | −13.481 | D4 | | |
| K: | 2.000000 | | | |
| A: 1.616460e−004 | B: 3.996546e−007 | C: 9.450278e−008 | D: 1.817467e−011 | |
| 17 | Infinity | 2.79 | 1.51680 | 64.2 |
| 18 | Infinity | 0.53 | | |
| IMG | | | | |

| | Wide Angle Position | Middle Position | Telephoto Position |
|---|---|---|---|
| D1 | 16.98 | 8.51 | 1.50 |
| D2 | 5.46 | 4.87 | 3.88 |
| D3 | 1.12 | 1.70 | 2.70 |
| D4 | 27.66 | 32.97 | 40.42 |

Figure 2B:
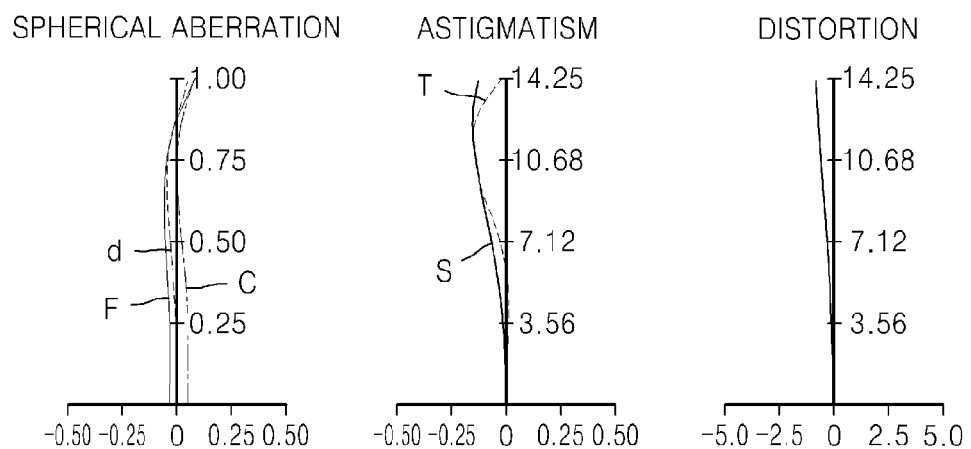

FIGS. 2A, 2B, and 2C are aberration diagrams showing longitudinal spherical aberration, astigmatism, and distortion respectively in the wide angle position, the middle position, and the telephoto position of the zoom lens of FIG. 1, according to an embodiment.

In the spherical aberration, a line C having a wavelength of 656.28 nm, a line d having a wavelength of 587.56 nm, and a line F having a wavelength of 486.13 nm are shown. In the astigmatism, T and S denote curves respectively on a tangential surface and a sagittal surface.

FIG. 3 is a diagram of optical arrangements of a zoom lens in a wide angle position, a middle position, and a telephoto position, according to another embodiment. The first lens group G1 includes a first lens 112 having a meniscus shape and constituting a negative lens, and a second lens 122 constituting a positive lens. Unlike the zoom lens according to the previous embodiment of FIG. 1, the first lens group G1 of the zoom lens according to the current embodiment of FIG. 3 includes two pieces of lenses, and at least one surface of the first lens group G1 is aspheric for aberration compensation. In the current embodiment, both surfaces of the first lens group G1 are aspheric. The second lens group G2 includes a third lens 212 constituting one piece of positive lens, and at least one surface of the third lens 212 is aspheric for aberration compensation. The third lens group G3 includes a fourth lens 312 constituting a positive lens. The fourth lens group G4 includes a fifth lens 412 constituting a negative lens and a sixth lens 422 constituting a positive lens.

Lens data of the zoom lens according to the current embodiment is as follows.

| EFL: 20.63~27.81~38.80 mm Fno: 3.65~4.16~4.92 2ω: 72.25~54.6~40.0 | | | | |
|---|---|---|---|---|
| Surf | Radius | Thick | Ind | Abv |
| 1 | 28.037 | 1.20 | 1.84666 | 23.8 |
| 2 | 13.541 | 3.63 | | |
| 3 | −800.000 | 1.20 | 1.75500 | 52.3 |
| 4 | 18.779 | 1.87 | | |
| 5 | 19.779 | 2.44 | 1.84666 | 23.8 |
| 6 | 78.483 | D1 | | |

-continued

| | EFL: 20.63~27.81~38.80 mm Fno: 3.65~4.16~4.92 2ω: 72.25~54.6~40.0 | | | |
|---|---|---|---|---|
| Surf | Radius | Thick | Ind | Abv |
| 7 | Infinity | 0.00 | | |
| 8* | 21.051 | 2.16 | 1.58313 | 59.5 |
| ASP | | | | |
| K: −1.000000 | | | | |
| A: −4.308475e−005 | B: 2.409897e−008 | C: −7.385826e−009 | D: 1.077548e−010 | |
| 9 | −32.698 | 0.10 | | |
| STO | Infinity | D2 | | |
| 11 | 34.414 | 1.64 | 1.48749 | 70.4 |
| 12 | −55.600 | D3 | | |
| 13 | −32.126 | 0.70 | 1.72825 | 28.3 |
| 14 | 17.616 | 1.12 | | |
| 15* | −46.127 | 2.00 | 1.69350 | 53.2 |
| ASP | | | | |
| K | 0.000000 | | | |
| A: 7.990710e−005 | B: −7.283741e−007 | C: 1.325045e−007 | D: −1.343725e−009 | |
| 16* | −13.481 | D4 | | |
| ASP | | | | |
| K: | 2.000000 | | | |
| A: 1.616460e−004 | B: 3.996546e−007 | C: 9.450278e−008 | D: 1.817467e−011 | |
| 17 | Infinity | 2.79 | 1.51680 | 64.2 |
| 18 | Infinity | 0.53 | | |
| IMG | | | | |

| | Wide Angle Position | Middle Position | Telephoto Position |
|---|---|---|---|
| D1 | 18.95 | 9.41 | 1.5 |
| D2 | 3.80 | 3.62 | 3.12 |
| D3 | 2.58 | 2.76 | 3.25 |
| D4 | 27.2 | 32.40 | 39.58 |

Figure 4C:
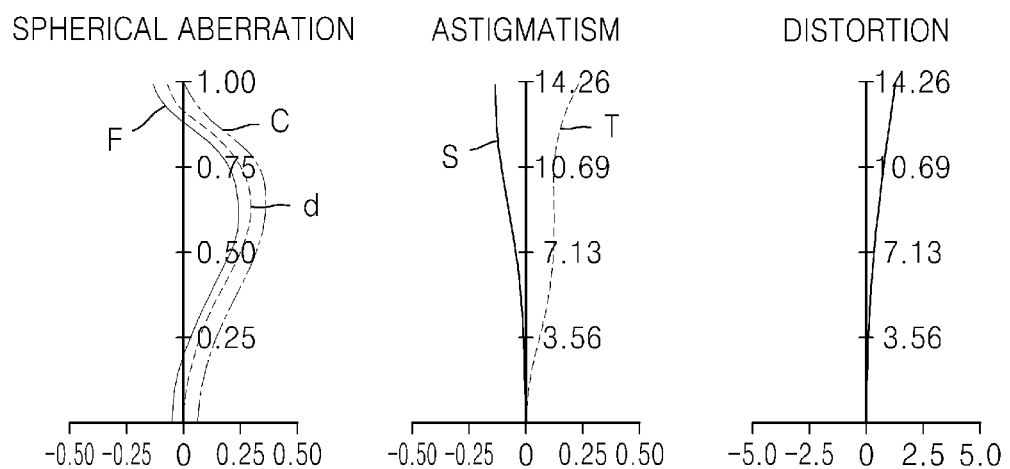

FIGS. 4A, 4B, and 4C are aberration diagrams showing longitudinal spherical aberration, astigmatism, and distortion respectively in the wide angle position, the middle position, and the telephoto position of the zoom lens of FIG. 3, according to an embodiment.

FIG. 5 is a diagram of optical arrangements of a zoom lens in a wide angle position, a middle position, and a telephoto position, according to another embodiment.

The first lens group G1 includes a first lens 113 having a meniscus shape and constituting a negative lens, a second lens 123 constituting a negative lens, and a third lens 133 constituting a positive lens. The second lens group G2 includes a fourth lens 213 constituting one piece of positive lens. At least one surface of the fourth lens 213 is aspheric. The third lens group G3 includes a fifth lens 313 constituting a positive lens. The fourth lens group G4 includes a sixth lens 413 constituting a negative lens and a seventh lens 423 constituting a positive lens.

Lens data of the zoom lens according to the current embodiment is as follows.

| | EFL: 19.00~27.81~40.00 mm Fno: 3.60~4.00~5.27 2ω: 76.98~54.28~39.54 | | | |
|---|---|---|---|---|
| Surf | Radius | Thick | Ind | Abv |
| 1 | 22.890 | 1.20 | 1.88682 | 28.7 |
| 2 | 12.736 | 3.96 | | |
| 3 | 132.652 | 1.20 | 1.75500 | 52.3 |
| 4 | 17.961 | 3.04 | | |
| 5 | 18.961 | 1.92 | 1.84666 | 23.8 |
| 6 | 32.174 | D1 | | |
| 7 | Infinity | 0.00 | | |
| 8* | 19.237 | 2.25 | 1.59262 | 59.6 |
| ASP | | | | |
| K: | −1.000000 | | | |
| A: −1.583792e−005 | B: −1.807165e−007 | C: 4.694510e−009 | D: −6.548397e−011 | |
| 9 | −35.909 | 0.89 | | |
| STO | Infinity | D2 | | |
| 11 | 36.259 | 1.58 | 1.46562 | 88.0 |
| 12 | −55.600 | D3 | | |
| 13 | −32.174 | 0.70 | 1.72427 | 27.9 |
| 14 | 20.432 | 1.38 | | |
| 15* | −45.081 | 2.00 | 1.69350 | 53.2 |
| ASP | | | | |
| K: | 0.000000 | | | |

-continued

EFL: 19.00~27.81~40.00 mm Fno: 3.60~4.00~5.27 2ω: 76.98~54.28~39.54

| Surf | Radius | Thick | Ind | Abv |
|---|---|---|---|---|
| 16* ASP | A: −9.401767e−005 B: −9.801962e−006 −14.063 K: 2.000000 | C: 3.166325e−007 D4 | D: −8.891901e−009 | |
| 17 | A: 5.553594e−005 B: −7.365590e−006 Infinity | C: 2.489799e−007 2.79 | D: −5.615594e−009 1.51680 | 64.2 |
| 18 IMG | Infinity | 0.55 | | |

| | Wide Angle Position | Middle Position | Telephoto Position |
|---|---|---|---|
| D1 | 16.56 | 7.53 | 1.5 |
| D2 | 7.26 | 5.82 | 3.84 |
| D3 | 1.12 | 2.56 | 4.54 |
| D4 | 25.22 | 32.34 | 41.16 |

Figure 6A:
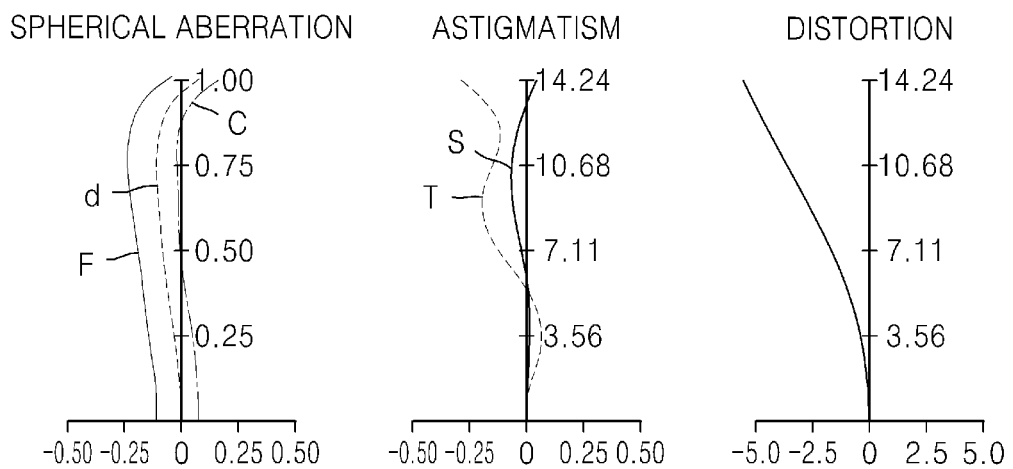
Figure 6B:
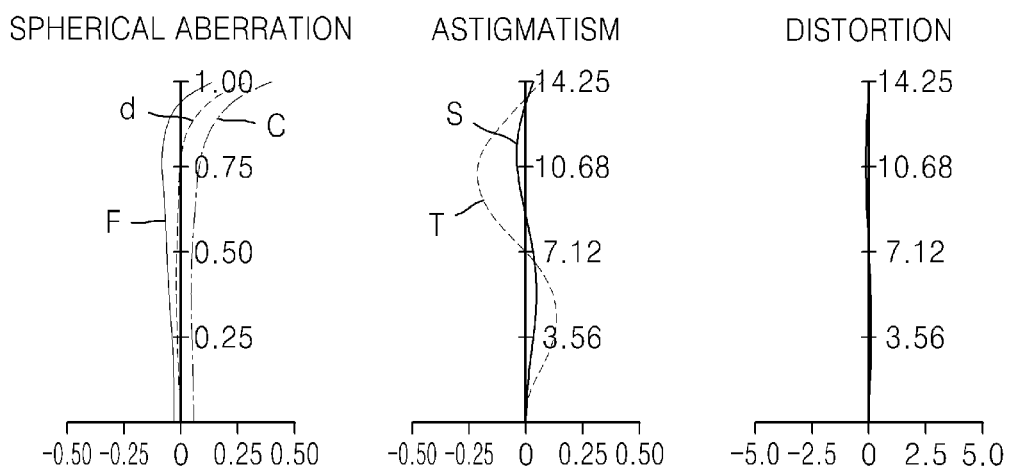

FIGS. 6A, 6B, and 6C are aberration diagrams showing longitudinal spherical aberration, astigmatism, and distortion respectively in the wide angle position, the middle position, and the telephoto position of the zoom lens of FIG. 5, according to an embodiment.

A following table shows that the zoom lenses according to the embodiments satisfy above-described conditions.

| | Zoom Lens of FIG. 1 | Zoom Lens of FIG. 3 | Zoom Lens of FIG. 5 |
|---|---|---|---|
| $(L_{23W} - L_{23T})/L_{23W}$ | 0.29 | 0.17 | 0.42 |
| V3 | 70.4 | 61.0 | 88.0 |

The zoom lenses according to the embodiments have a compact structure as an AF lens group is miniaturized and light-weighted, while having excellent optical performance.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A zoom lens comprising:
    a first lens group having a negative refractive power, and comprises two negative lenses and one positive lens;
    a second lens group having a positive refractive power;
    a third lens group having a positive refractive power and comprising one piece of positive lens; and
    a fourth lens group having a negative refractive power,
wherein the first, second, third, and fourth lens groups are sequentially disposed in an order from an object side to an image surface side of the zoom lens, all distances between adjacent lens groups change and the third lens group performs focusing while zooming from a wide angle position to a telephoto position, and a following condition is satisfied:

$$0 < (L_{23W} - L_{23T})/L_{23W} < 0.5,$$

wherein $L_{23W}$ denotes a distance between a lens surface of the image surface side of the second lens group and a lens surface of the object side of the third lens group in the wide angle position, and $L_{23T}$ denotes a distance between a lens surface of the image surface side of the second lens group and a lens surface of the object side of the third lens group in the telephoto position.

2. The zoom lens of claim 1, wherein the Abbe number v3 of the positive lens included in the third lens group satisfies v3>60.

3. The zoom lens of claim 2, wherein the second lens group comprises one positive lens.

4. The zoom lens of claim 3, wherein at least one surface of the positive lens included in the second lens group is aspheric.

5. The zoom lens of claim 1, wherein the second lens group comprises one positive lens.

6. The zoom lens of claim 5, wherein at least one surface of the positive lens included in the second lens group is aspheric.

7. The zoom lens of claim 1, wherein the first lens group has at least one aspheric surface.

8. The zoom lens of claim 7, wherein both surfaces of the negative lens of the first lens group are aspheric.

9. The zoom lens of claim 1, wherein a distance between a lens surface closest to the image surface side of the second lens group and a lens surface closest to the object side of the fourth lens group is uniformly maintained while zooming from the wide angle position to the telephoto position.

10. The zoom lens of claim 1, wherein a distance between a lens surface closest to the image surface side of the second lens group and a lens surface closest to the object side of the fourth lens group is uniformly maintained while zooming from the wide angle position to the telephoto position.

11. A zoom lens comprising:
a first lens group having a negative refractive power, and comprises one negative lens and one positive lens;
a second lens group having a positive refractive power;
a third lens group having a positive refractive power and comprising one piece of positive lens; and
a fourth lens group having a negative refractive power,
wherein the first, second, third, and fourth lens groups are sequentially disposed in an order from an object side to an image surface side of the zoom lens, all distances between adjacent lens groups change and the third lens group performs focusing while zooming from a wide angle position to a telephoto position, and a following condition is satisfied:

$$0 < (L_{23W} - L_{23T})/L_{23W} < 0.5,$$

wherein $L_{23W}$ denotes a distance between a lens surface of the image surface side of the second lens group and a lens surface of the object side of the third lens group in the wide angle position, and $L_{23T}$ denotes a distance between a lens surface of the image surface side of the second lens group and a lens surface of the object side of the third lens group in the telephoto position.

12. The zoom lens of claim 11, wherein the Abbe number v3 of the positive lens included in the third lens group satisfies v3>60.

13. The zoom lens of claim 12, wherein the second lens group comprises one positive lens.

14. The zoom lens of claim 13, wherein at least one surface of the positive lens included in the second lens group is aspheric.

15. The zoom lens of claim 11, wherein the second lens group comprises one positive lens.

16. The zoom lens of claim 15, wherein at least one surface of the positive lens included in the second lens group is aspheric.

17. The zoom lens of claim 11, wherein the first lens group has at least one aspheric surface.

18. The zoom lens of claim 17, wherein both surfaces of the negative lens of the first lens group are aspheric.

* * * * *